United States Patent [19]

Yoshida

[11] Patent Number: 4,940,321

[45] Date of Patent: Jul. 10, 1990

[54] DRIVE UNIT FOR ELECTRICALLY DRIVEN REMOTE-CONTROLLED MIRROR

[75] Inventor: Norio Yoshida, Isehara, Japan

[73] Assignee: Ichikoh Industries, Ltd., Tokyo, Japan

[21] Appl. No.: 275,713

[22] Filed: Nov. 23, 1988

[30] Foreign Application Priority Data

Nov. 26, 1987 [JP] Japan .................. 62-178891[U]
Nov. 26, 1987 [JP] Japan .................. 62-178893[U]
Jul. 25, 1988 [JP] Japan .................. 63-97409[U]

[51] Int. Cl.[5] ..................... B60R 1/06; G02B 7/18
[52] U.S. Cl. .................... 350/633; 74/89.15
[58] Field of Search ............ 350/634, 633, 637, 636, 350/632; 74/89.15

[56] References Cited

U.S. PATENT DOCUMENTS

| 4,482,211 | 11/1984 | Fisher | 350/637 |
|---|---|---|---|
| 4,494,420 | 1/1985 | Sakuma | 350/633 |
| 4,611,501 | 9/1986 | Brown | 350/637 |
| 4,696,555 | 9/1987 | Enomoto | 350/634 |

FOREIGN PATENT DOCUMENTS

| 265973 | 5/1988 | European Pat. Off. . | |
| 140246 | 8/1982 | Japan | 350/634 |
| 179349 | 9/1985 | Japan | 350/637 |

*Primary Examiner*—Jon W. Henry
*Attorney, Agent, or Firm*—Foley & Lardner, Schwartz, Jeffery, Schwaab, Mack, Blumenthal & Evans

[57] ABSTRACT

In a drive unit for an electric remote control mirror, a pair of screw rods for slanting the mirror around horizontal and vertical axes is disposed movably forwardly and backwardly within the drive casing. Within the drive casing, there is disposed a pair of drive motors, of which the rotations are transmitted through a reduction gear group to a pair of rotation members, of which the rotations are converted into forward and backward movements of the pair of screw rods. Each of the rotation members is composed of a shaft having a pair of arm members with a screw thread which is in mesh with a screw thread formed on the inner circumference of the screw rod, a hollow cylindrical rotation body having a gear in mesh with the reduction gear group and a space in which the screw rod is placed, and a plurality of connection members extending radially and which provides a connection between the base of the shaft and the lower end of the rotation body, each of the connection members being formed relatively thin so that when the shaft is exposed to a force from the screw rod, the connection member is resiliently deformable. When each screw rod is moved forwardly or backwardly, the shaft is exposed to a force from the screw rod, but since the plural connection members are resiliently deformed, the shaft can be slanted axially so that each screw rod can positively follow up with the pivoting of the mirror.

8 Claims, 7 Drawing Sheets

DRIVE UNIT FOR ELECTRICALLY DRIVEN REMOTE-CONTROLLED MIRROR

BACKGROUND OF THE INVENTION

1. Field of the Invention

The present invention relates to a drive unit for electrically driven remote-controlled mirror, and more particularly to an improved drive mechanism which slants a mirror body pivotably supported inside a mirror housing and to which a mirror is secured, around a horizontal and vertical axes passing through the central axis of a pivot.

2. Description of the Prior Art

In a conventional drive unit for slanting the mirror of an electric remote control mirror apparatus (disclosed for example in U.S. Pat. No. 4,696,555), the mirror body to which the mirror is fixed is pivotably disposed in relation to a seat or receptacle formed on the surface of a drive unit casing disposed within the mirror housing and which includes two drive motors and a group of reduction gears. In such drive unit, a pair of internally threaded cylindrical screw rods is inserted into two openings, respectively, formed on two straight lines passing through the center of the seat formed on the drive unit casing and which are nearly perpendicular to each other, the screw rods being movable in a direction generally perpendicular to the surface of the drive unit casing but blocked against rotation. The end of each screw rod is connected, as blocked against rotation, to the seat formed on the rear side of the mirror body, and rotating shaft members having a pair of arm members provided with a pair of external thread portions in mesh with the internal threads, respectively, of the screw rods are rotatably supported around shafts formed on the bottom wall in the drive unit casing. Further, a hollow cylindrical gear member having on the outer cylindrical circumference thereof a gear in mesh with the last reduction gear among the drive reduction gears in group is disposed so as to rotate with the rotating shaft member, and the screw rods are housed in the hollow portions, respectively, of the gear members.

In such mirror drive unit, the rotation of the motor is converted into a rotation of the gear member and the rotating shaft member through the reduction gear group, and further it is transmitted to the internal thread of the screw rod, in mesh with the external thread of the rotating shaft member. Since each of the screw rods is blocked against rotating, the screw rod itself are axially moved forwardly or backwardly depending upon the rotating direction of the motor. The substantial forward or backward movement of each screw rod causes the mirror body to slant around the horizontal or vertical axis pivoting around the center pivot. The outer circumference of each screw rod is in contact with the O-ring disposed within the drive unit casing and surrounding an opening formed in the drive unit casing, the internal thread form on the inner circumference of each screw rod is in mesh with the external thread formed on the ends of the arm members in pair formed on the top of the rotating shaft member, and a U-shaped spring is disposed between the arm members in pair and which always presses elastically the pair of external threads of the rotating shaft member to the internal threads of the screw rods. Since follows up with the pivoting movement around the center pivot of the mirror body within a predetermined angle, each of the screw rods is forcibly slanted with respect to the axial center in practice when it is moved forwardly or backwardly, so that the pair of arm members is forcibly deformed according to the slant of each screw rod while the external thread formed on the end of each arm member is kept in mesh with the external thread of each screw rod. The base of each rotating shaft member is rotatably supported around a shaft formed on the bottom wall inside the drive unit casing. The deformation of the arm members in pair causes the friction between the internal threads of the screw rods and the pair of external threads in mesh with the internal threads to increase, with the result that the motor for moving forwardly or backwardly each screw rod is applied with an extra load.

SUMMARY OF THE INVENTION

The object of the present invention is to overcome the above-mentioned drawbacks of the drive unit for the conventional electric remote control mirror by providing a drive unit in which a pair of motors as drive source for moving forwardly and backwardly a pair of screw rods for slating around horizontal and vertical axes a mirror pivotably supported by a pivot joint is not applied with any extra load.

Another object of the present invention is to provide a drive unit for an electric remote control mirror, in which the forward or backward move of a pair of screw rods driven by motors, respectively, for slanting around horizontal and vertical axes a mirror pivotably supported by a pivot joint positively follows up with the pivoting of the mirror.

A still another object of the present invention is to provide a drive unit for an electric remote control mirror, in which when a pair of screw rods driven by motors, respectively, is moved forwardly or backwardly, each screw rod follows up with the pivoting of the mirror for their axes to slant within a small predetermined angle.

The above-mentioned object can be achieved by providing a drive unit for an electric remote control mirror, having a pair of rotation members rotatably mounted within a housing member, each composed of a shaft provided with at least two arm members having plural screw threads coupled to the screw threads of each of the screw rods and which are spaced apart from each other, a hollow cylindrical rotation body holding therein the screw rod and shaft and having formed integrally therewith on the outer circumference thereof a gear which is in mesh with a reduction gear which is connected to a drive motor, and a plurality of radially extending connection members to provide near the base of the shaft a connection between the shaft and rotation body and which is formed relatively thin so as to resiliently be deformable, wherein the rotation of the rotation member by the drive motor is converted into a forward or backward movement of each screw rod but since the connection member connecting the shaft with the rotation body is resiliently deformed, the shaft and the screw rods in mesh with a pair of screw threads on the shaft follow up with the rotation around the horizontal or vertical axis of the mirror to have their respective axes slanted within a small predetermined angle, so that the screw rod is smoothly moved forwardly or backwardly without any extra load applied to the motors.

BRIEF DESCRIPTION OF THE DRAWINGS

These and other objects and advantages of the present invention will be better understood from the following description made by way of example of the embodiments of the present invention with reference to the drawings in which:

FIG. 1 is a schematic diagram of the entire electric remote control mirror;

FIG. 2 is a sectional view of the essential portions of the drive unit;

FIG. 3 is a sectional view of the drive unit, showing the rotation member in FIG. 2 rotated around 90 degrees;

FIG. 4 is a bottom view, enlarged in scale, of the rotation member;

FIG. 6 is a sectional view of the essential portions of the drive unit;

FIG. 7 is a sectional view of the essential portions of the drive unit, showing the rotation member of the drive unit in FIG. 6 rotated around 90 degrees;

FIG. 8 is a perspective view, enlarged in scale, of the rotation member;

FIG. 9 is a bottom view, enlarged in scale, of the rotation member;

FIG. 10 is a sectional view taken along the line X—X in FIG. 9;

FIG. 11 is a bottom view of the rotation member;

FIG. 12 is a sectional view taken along the line XII—XII;

DETAILED DESCRIPTION OF THE PREFERRED EMBODIMENTS

Figure 1:
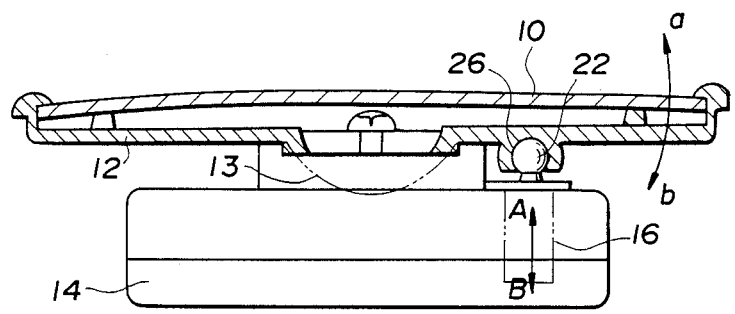
FIGS. 1 to 4 show a first embodiment of the drive unit for an electric remote control mirror according to the present invention.
Figure 2:
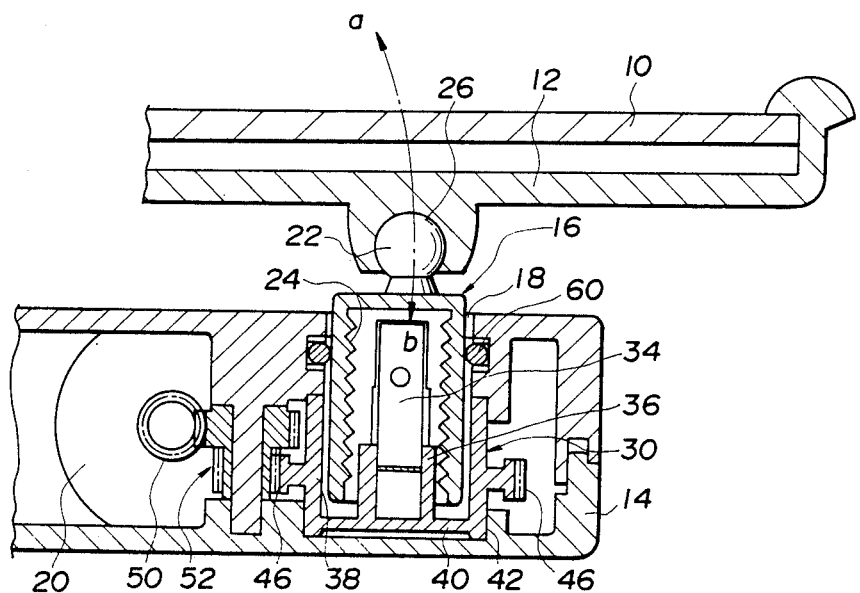
Figure 3:
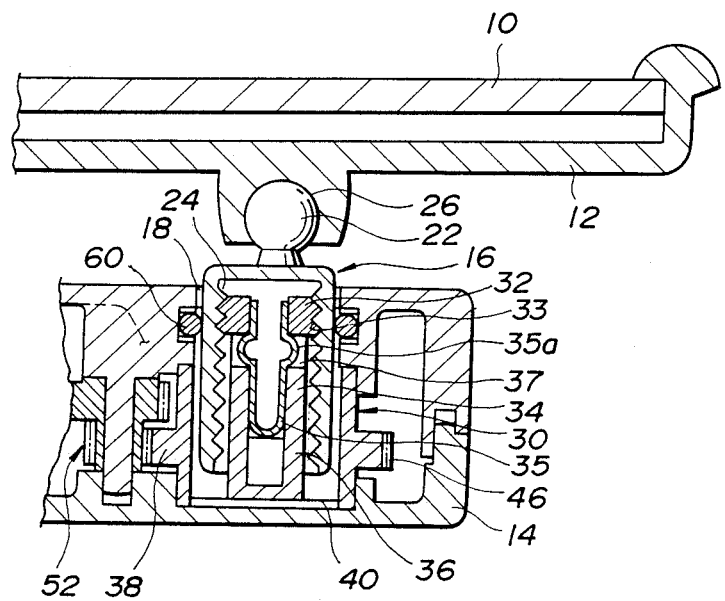

Referring now to FIGS. 1 to 4, which show a first embodiment of the drive unit for an electric remote control mirror. A mirror 10 fixed to a mirror body 12 is pivotably supported on a drive unit casing 14 disposed within a mirror housing (not shown) by means of a pivot joint 13. A pair of screw rods 16 (only one of them is shown for the simplicity of illustration) for slanting the mirror body 12 is inserted into the casing 14 through openings 18, respectively (only one of them is shown) formed in the casing 14, and the screw rods 16 are so arranged as to be driven by a pair of motors 20 (only one of them is shown). Each of these screw rods 16 is a hollow cylinder having a ball portion 22 formed at an end thereof, and has an internal thread 24 formed on the inner surface thereof. Each of the ball portions 22 is fitted in a spherical receptacle or seat 26 formed on the back of the mirror body 12. These spherical receptacles 26 lie on two straight lines passing through the center of the pivot joint in FIG. 1 and are perpendicular to each other, namely, on a vertical and a horizontal axis, respectively. When the screw rod 16 shown is moved forwardly or backwardly in the direction of arrow A or B, the mirror body 12 is rotated in the direction of arrow a-b around the pivot joint 13, i.e., it is slanted around the vertical axis. On the other hand, when the other screw rod 16 (not shown) is moved forwardly or backwardly, the mirror body 12 is slanted around the horizontal axis. In this embodiment, the central axis of the hollow cylinder composing each screw rod 16 passes not through the center of the ball portion 22 formed on the end of the screw rod 16, rather, the central axis of the hollow cylinder is offset from the center of the ball portion 22 as shown in FIG. 2, so that each ball portion 22 is blocked against rotation within each spherical receptacle or seat 26.

The reference numeral 30 indicates a rotation member for transmission of the rotation of the motor 20 for each screw rod 16. The rotation member 30 comprises a shaft 36 having a screw thread 33 in mesh with the internal thread 24 on the inner surface of each screw rod 16 a pair of arms 34 spaced away from each other, a rotation body 38 formed like a hollow cylinder for holding therein the screw rod 16 and shaft 36 and having a spur gear 46 formed circumferentially integrally therewith on the outer circumference thereof, and a connection member 40 to connect the base of the shaft 36 and the rotation body 38 to each other.

The rotation member 30 is disposed nearly coaxially with the screw rod 16, and is received by a cylindrical receiving recess 42 formed on the base of the casing 14. That is, the outer circumference of the rotation body 38 is in light contact with the inner wall of the receiving recess 42 while the lower end of the hollow cylinder is in contact with the bottom wall of the receiving recess 42, and the rotation body 38 is rotatably supported in the receiving recess 42. The pair of arms 34 formed at the end of the shaft 36 are disposed in a position offset 180 degrees from the axis of rotation of the rotation body 30, namely, the arms 34 are disposed opposite to each other. Further, a nearly U-shaped leaf spring 35 is disposed between the pair of arms 34.

Figure 4:
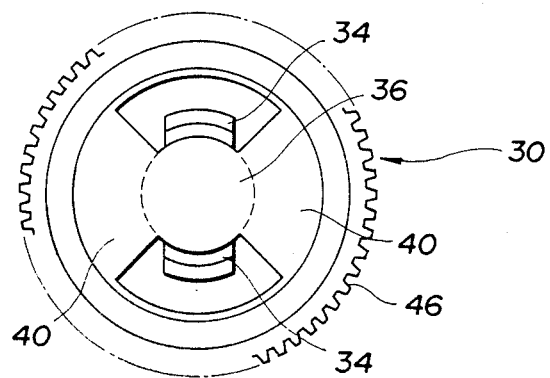

There are disposed small protrusions 35a at opposite positions on the opposite arms of the leaf springs 35, and the protrusions 35a are fitted in the small holes 37 formed in the pair of arms 34. Due to this arrangement, the external thread 33 on the arm end is pressed onto the internal thread 24 of the screw rod 16 while the leaf spring 35 does not come off the pair of arms 34. As shown in FIG. 4, a pair of sector-shaped relatively thin connection members 40 is disposed to provide a connection between the base of the shaft 36 and the inner surface of the rotation body 38. The rotation member 30 including the connection members 40 is integrally formed from a polyacetal resin. The thickness of the connection members 40 is selected to be thin as compared with the shaft 36 and rotation body 38 so that when an external force is applied, the shaft 36 is resiliently deformable, namely, it can be slanted with respect to the axis of rotation of the rotation member 30 following the rotation of the mirror base 12 around the pivot 13. In this embodiment, the thickness of the connection members 40 is selected to be about 0.7 mm, the wall thickness of the shaft 36 is about 1.5 mm, and the wall thickness of the rotation body 38 is about 1.1 mm. The pair of connection members 40 is disposed in positions offset away from the pair of arms 34, i.e., in such positions that they are perpendicular to each other as shown in FIG. 4, so that the shaft 36 is easy to be slanted in a direction in which the pair of arms 34 is connected to each other, rather than in a direction in which the pair of connection members 40 is connected to each other.

The spur gear 46 formed circumferentially on the outer circumference of the rotation body 38 is coupled to a worm 50 fixed on the output shaft of the motor 20 through a reduction double-geared spur gear 52. The forward or reverse rotation of the motor 20 is converted into a rotation of the rotation body 38 by means of the reduction double-geared spur gear 52 and further into a final forward or backward movement of the screw rod 16. At this time, the screw rod 16 is axially slanted through a small predetermined angle following the pivoting of the mirror body 12 while moving forwardly or backwardly. However, because the pair of connection members 40 connecting the rotation body 38 and shaft 36 is resiliently deformed so that the shaft 36 is slanted around near the center of the base thereof in response to the slanting of the screw rod 16, the external thread 33 formed on the arm 34 and which is in mesh with the internal thread 24 formed on the inner surface of the screw rod 16 is not exposed to any excessive load and thus also the motor is not exposed to any excessive load.

In this embodiment, the pair of sector-shaped connection members 40 connects the base of the shaft 36 and the inner surface of the rotation body 38 to each other. However, the shape and number of these connection members 40 are not limited to those in this embodiment, but the connection members 40 may be of such a resiliently deformable structure that the shaft 36 can be slanted following the rotation of the mirror base 12 around the pivot 13. The reference numeral 60 indicates an O-ring disposed in a circular recess formed in the inner wall of the opening 18 and which is in contact with the outer circumference of the screw rod 16 in order to prevent that any dust or a liquid like water comes into the inside of the casing 14 while ensuring a smooth forward/backward movement of the screw rod 16.

Figure 5:
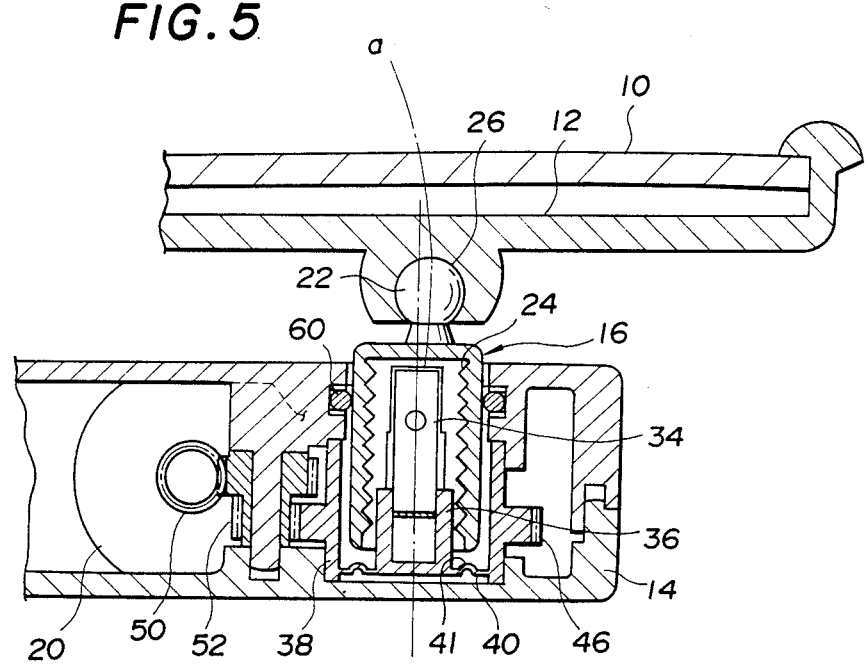
FIG. 5 is a sectional view of the essential portions of a variant of the connection members in the first embodiment.
Figure 6:
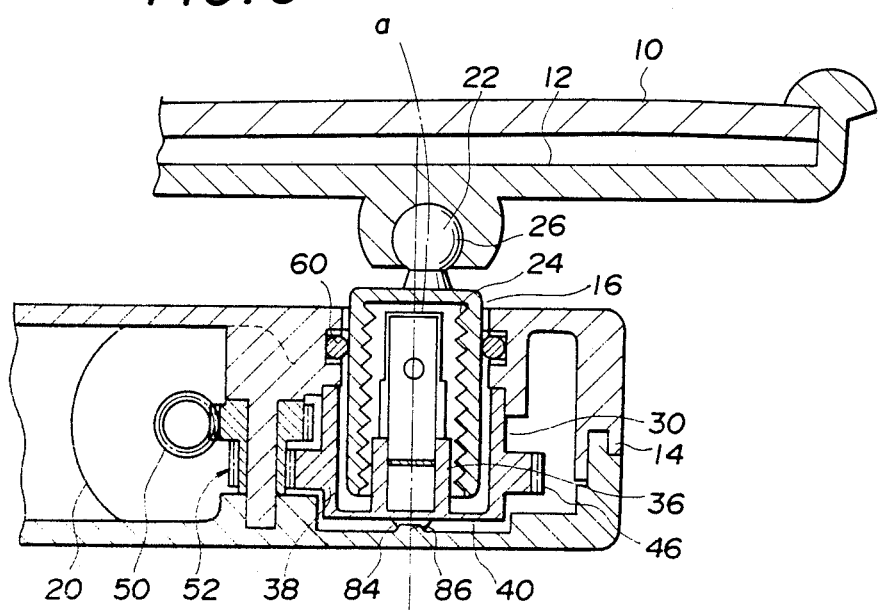
FIGS. 6 to 10 show a second embodiment of the drive unit for an electric remote control mirror according to the present invention.

FIG. 5 shows a variant of the connection member 40 in the first embodiment. As shown, the pair of connection members 40 has a flute formed circumferentially thereon to improve the resilience of the connection members 40. That is, in the first embodiment, the pair of connection members 40 are disposed in positions offset from the pair of arms 34, so that the shaft 36 is easily slanted in a direction in which the arms 36 in pair are connected to each other, rather than in a direction in which the connection members 40 in pair are connected to each other. It will be obvious that the provision of such circular flute 41 facilitates the shaft 36 to slant also in the direction in which the connection members 40 are connected to each other. Actually, since the radial length of the connection members 40 is designed 3 to 5 mm, one such flute 41 is sufficient. However, more than one such flute 41 may be provided concentrically. That is, the pair of connection members 40 may be formed into aneroid diaphragm-shaped flat members.

FIGS. 6 to 10 shows a second embodiment of the drive unit for an electric remote control mirror. The same or like elements as those in the first embodiment are indicated with same or like reference numerals also in this second embodiment.

Figure 8:
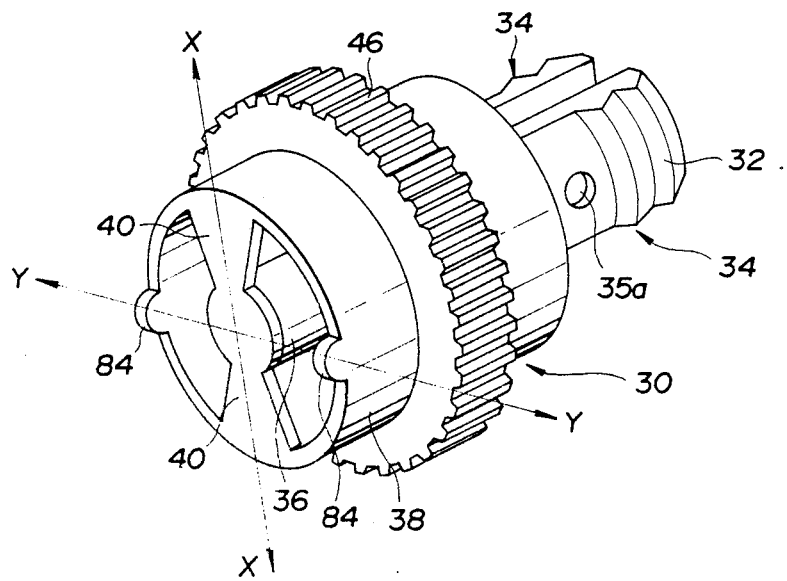
Figure 9:
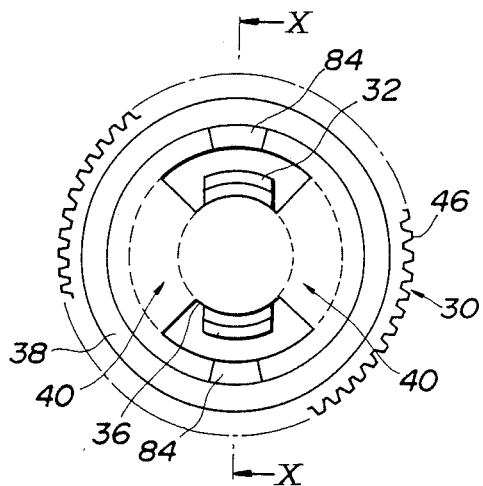
Figure 10:
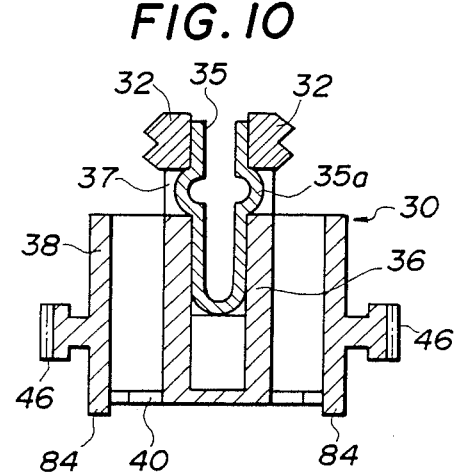

In the second embodiment, the lower end of the shaft 36 and the lower end of the rotation body 38 are connected to each other by a pair of connection members 40 extending in a direction X—X, and at the lower end of the rotation body 38 a pair of protrusions 84 is formed extending in a direction parallel to the shaft 36. The pair of protrusions 84 is diametrically disposed as shown in FIG. 8 and in positions 90 degrees offset from the pair of connection members 40, namely, in a line indicated with an arrow Y—Y. Each of the pair of protrusions 84 is formed from a portion of the outer circumference of the rotation body 38 which is extended parallelly with the shaft 36. The end of each protrusion 84 has a curved surface of a predetermined curvature and is in contact with the inside bottom face of the casing 14. The provision of such a pair of protrusions 84 enables the swinging of the rotation body 38 which takes the direction of arrow Y—Y as axis of oscillation, and provides a gap of a predetermined distance between the connection member 40 and the inside bottom face. The rotation member 30 thus formed is rotated as driven by the motor 20 by means of the reduction gear group 52 with the end of the pair of protrusions 84 being in contact with the inside bottom face of the casing 14, i.e., substantially supported on two diametrical points. Since the pair of connection members 40 and the pair of protrusions 84 are located offset from each other, when the shaft is exposed to a force from the screw rod 16, a pair of connection members 40 are twisted and/or the entire rotation body 38 can swing around the Y-X axis taking as fulcrum the pair of protrusions 84, whereby the shaft 36 can axially slant while rotating, so that it can positively follow the pivoting of the mirror body 12. In the first embodiment which has been described previously, the shaft 36 is easily slanted in a direction in which the pair of arms 34 are connected to each other, rather than in a direction in which the pair of connection members 40 are connected to each other, but it will be obvious that in the second embodiment, since the entire rotation body 36 can swing due to the pair of protrusions 84, the shaft 36, when applied with a force from the screw rod 16, is easily slanted in a direction in which the pair of connection members 40 are connected to each other.

Figure 7:
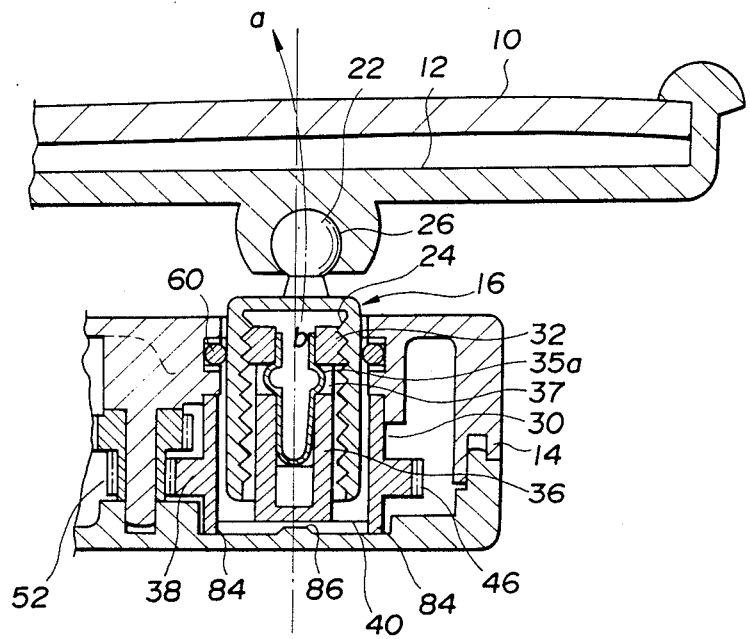

In this embodiment, there is also formed on the inside bottom face of the casing 14 opposite to the base of the shaft 36 a truncated-conical protrusion 86 extending axially as shown in FIG. 7. When the shaft 36 is exposed to an axial downward force from the screw rod 16, the protrusion 86 limits the descending distance of the shaft 36 to within the range of resilient deformation of the connection member 40. That is, the length of the pair of protrusions 84 composing the fulcrum of swing and the height of the truncated-conical protrusion 86 from the inside bottom face of the casing 14 should be selected in a manner that the shaft 36 can move axially downward within a range of the resilient deformation of the connection member 40. Thus, even when exposed to any excessive force from the screw rod 16, the shaft 36 is in contact, at the base thereof, with the truncated-conical protrusion 86, whereby the shaft 36 will not go down any more beyond a predetermined distance so that the connection member 40 will not brake.

Figure 11:
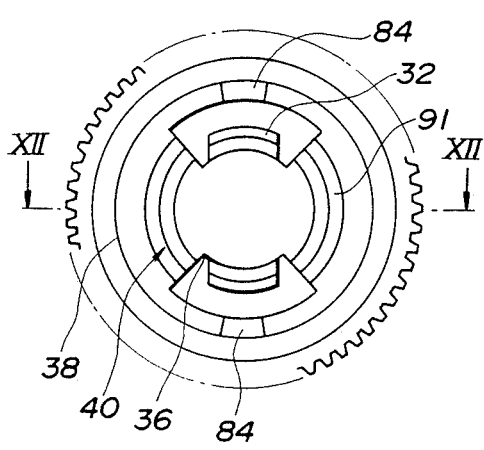
FIGS. 11 and 12 shows a variant of the connection member composing the rotation member in the second embodiment and which is provided with a circular flute.
Figure 12:
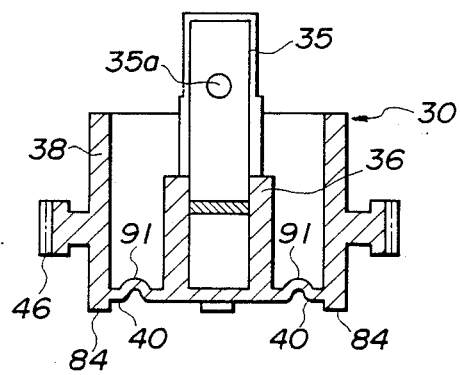

FIGS. 11 and 12 show a variant of the rotation member 30 in the second embodiment. The pair of sector-shaped connection members 40 composing the rotation member 30 has circumferentially formed at a portion thereof a circular flute 91 which facilitates the slanting of the shaft 36 in the direction in which the connection members 40 in pair are connected to each other. The flute 91 is not limited to a single one and more than one circular flute may be provided.

Figure 13:
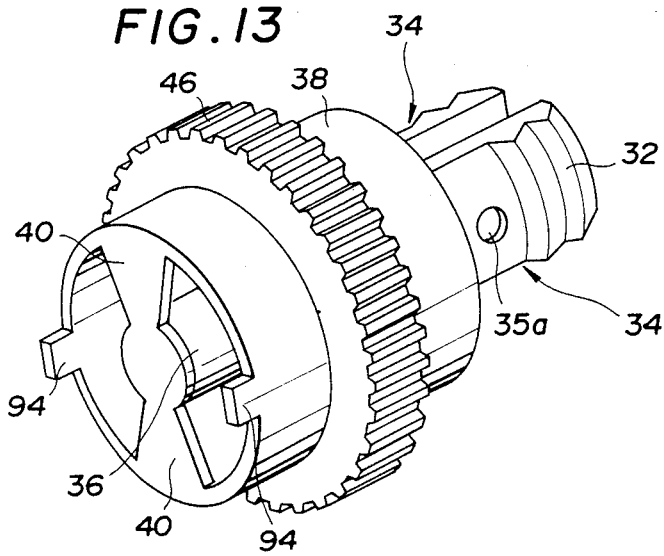
FIG. 13 is a perspective view, enlarged in scale, of the rotation member, showing a variant of the protrusion in the second embodiment.

FIG. 13 shows a variant of the pair of protrusions formed at the lower end of the rotation body 38. In this variant, the protrusion is indicated with reference numeral 94, and the end thereof is formed smooth and flat. The protrusion 94 thus formed has a large area of contact with the inside bottom face of the casing 14 as compared with the protrusion 84 having a curved end face as in the second embodiment. Being smooth and flat, the end of the protrusion 94 will not be any hindrance to the rotation of the rotation member 30 and substantially permits the rotation member 30 to swing.

Figure 14:
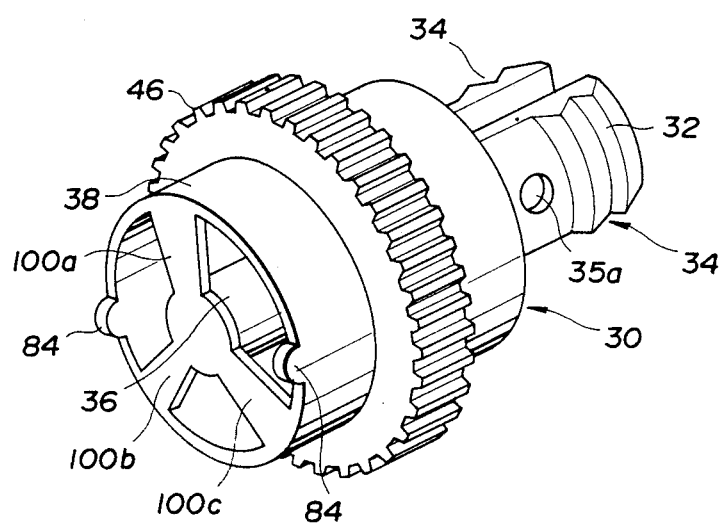
FIGS. 14 and 15 are perspective views, respectively, enlarged in scale, of a variant of the rotation member in the second embodiment.

FIG. 14 shows a variant of the connection member 40 in the second embodiment. In this variant, the connection members 40 are not made in pair but three in number. They are indicated with reference numbers 100a, 100b and 100c, respectively. The connection members 100a, 100b and 100c are formed with an angle of about 120 degrees around the shaft 36, and located offset from both the pair of protrusions 84. The larger the sector area of each of these connection members 100a, 100b and 100c, the higher their mechanical strength. It is understood that the sector area should be selected so that the connection members are resiliently deformable.

Figure 15:
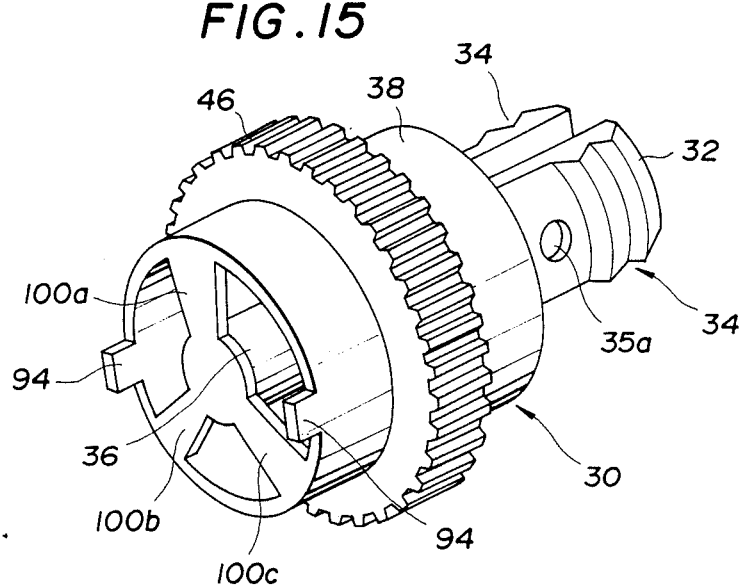

FIG. 15 shows a variant of the connection member 40 of the rotation member 40 shown in FIG. 13. It is substantially equivalent to the rotation member 30 shown in FIG. 14, so it will not be explained any further.

While the present invention has been particularly described with reference to specific embodiments and modifications thereof, it is to be understood that the words which have been used are words of description rather than limitation and that changes may be made within the purview of the appended claims without departing from the true scope and spirit of the present invention in its broader aspects.

I claim:

1. A drive unit for an electric remote control mirror, comprising:
    supporting means for holding within a mirror housing a mirror body having a mirror fixed thereon, said supporting means including a housing member fixed inside said mirror housing and means for pivotably supporting said mirror body;
    two ball bases mounted on the back side of said mirror body, one of which lies on a lateral pivot axis while the other lies on a longitudinal pivot axis, said lateral and longitudinal axes being perpendicular to each other;
    a pair of hollow cylindrical screw rods, each being internally threaded on the inner wall thereof, provided at the end portion thereof with a ball portion which fits in a corresponding one of said ball bases, and axially movable through a cylindrical hole formed in said housing member while being unrotatable with respect to said housing member;
    a pair of rotation members rotatably mounted within said housing member, each composed of a shaft provided with at least two arm members having plural screw threads coupled to the screw threads of each of said screw rods and which are spaced apart from each other, a hollow cylindrical rotation body holding therein said screw rod and shaft and having a gear integrally formed therewith on the outer circumference thereof, and a plurality of radially extending connection members to provide a connection between said shaft and rotation body and being formed relatively thin so as to resiliently be deformable;
    reduction gear means connected with the gear formed on the rotation body of said rotation member to transmit a driving force to each of said rotation member; and
    an electric motor means for driving said rotation member through said gear means;
    wherein said rotation member is arranged in a receiving recess formed on the bottom of said housing member and rotates with the whole circumference of the lower end of said cylindrical rotation body being in contact with said receiving recess and each of said connection members is integrally formed with said shaft and said rotation member spaced from the bottom wall of said receiving recess.

2. The drive unit for an electric remote control mirror according to claim 1, wherein said plural connection members are disposed in positions offset with respect to said pair of arm members.

3. The drive unit for an electric remote control mirror according to claim 2, wherein each of said connection members has at least a flute formed circumferentially thereon.

4. A drive unit for an electric remote control mirror, comprising:
    supporting means for holding within a mirror housing a mirror body having a mirror fixed thereon, said supporting means including a housing member fixed inside said mirror housing and means for pivotably supporting said mirror body;
    two ball bases mounted on the back side of said mirror body, one of which lies on a lateral pivot axis while the other lies on a longitudinal pivot axis, said lateral and longitudinal axes being perpendicular to each other;
    a pair of hollow cylindrical screw rods, each being internally threaded on the inner wall thereof, provided at the end portion thereof with a ball portion which fits in a corresponding one of said ball bases, and axially movable through a cylindrical hole formed in said housing member while being unrotatable with respect to said housing member;
    a pair of rotation members rotatably mounted within said housing member, each comprising a shaft provided with at least two arm members having plural screw threads coupled to the screw threads of each of said screw rods and which are spaced apart from each other, a hollow cylindrical rotation body holding therein said screw rod and shaft and having a gear integrally formed therewith on the outer circumference thereof, and a plurality of radially extending connection members to provide a connection between said shaft and rotation body and which is formed relatively thin so as to resiliently be deformable;
    reduction gear means connected with the gear formed on the rotation body of said rotation member to transmit a driving force to each of said rotation member; and
    wherein said cylindrical rotation body of said rotation member is provided at diametrical positions on the circumference of the lower end thereof with a pair of protrusions extending parallel but in opposite direction to said pair of arm members and which are in contact with the bottom of a receiving recess formed on the bottom of said housing member, so that said rotation body can swing around a straight line connecting said pair of protrusions.

5. The drive unit for an electric remote control mirror according to claim 4, wherein said plurality of connection members are disposed in positions offset from said pair of arm members.

6. The drive unit for an electric remote control mirror according to claim 4, wherein a stopper limiting the axial movement of said shaft is provided on the bottom wall of said housing member in a position opposing the base portion of said shaft of said rotation member.

7. The drive unit for an electric remote control mirror according to claim 5, wherein said protrusions are formed to have a substantially same curvature as that of the outer circumference of said cylindrical rotation body and are rounded at the ends thereof.

8. The drive unit for an electric remote control mirror according to claim 5, wherein each of said connection members has at least a flute formed circumferentially thereon.

* * * * *